No. 821,896. PATENTED MAY 29, 1906.
A. STEIN.
COLLAPSIBLE BABY CARRIAGE.
APPLICATION FILED MAY 10, 1905.
2 SHEETS—SHEET 1.
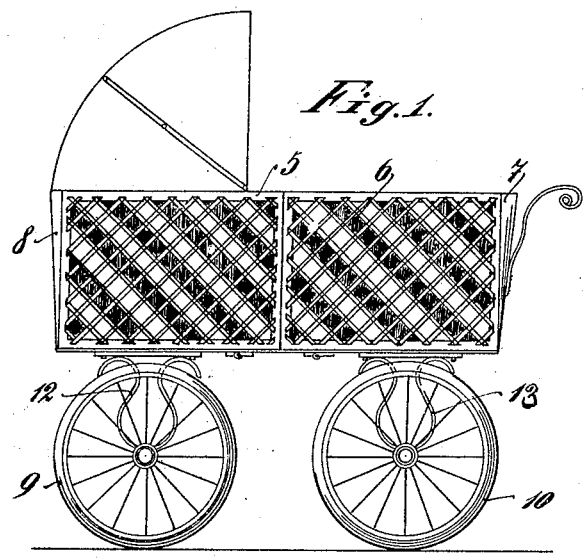
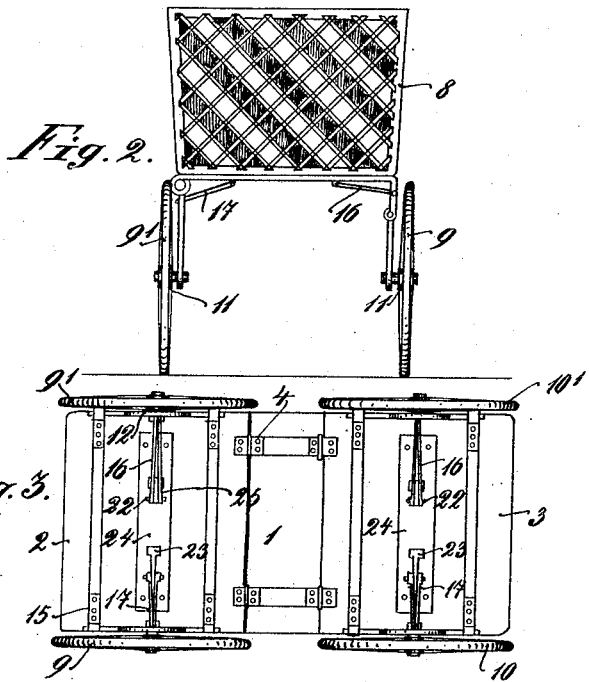
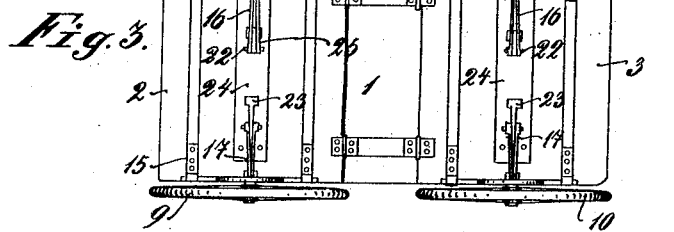
Witnesses:
Hans Müller
Hans Ernst
Inventor:
Alexander Stein

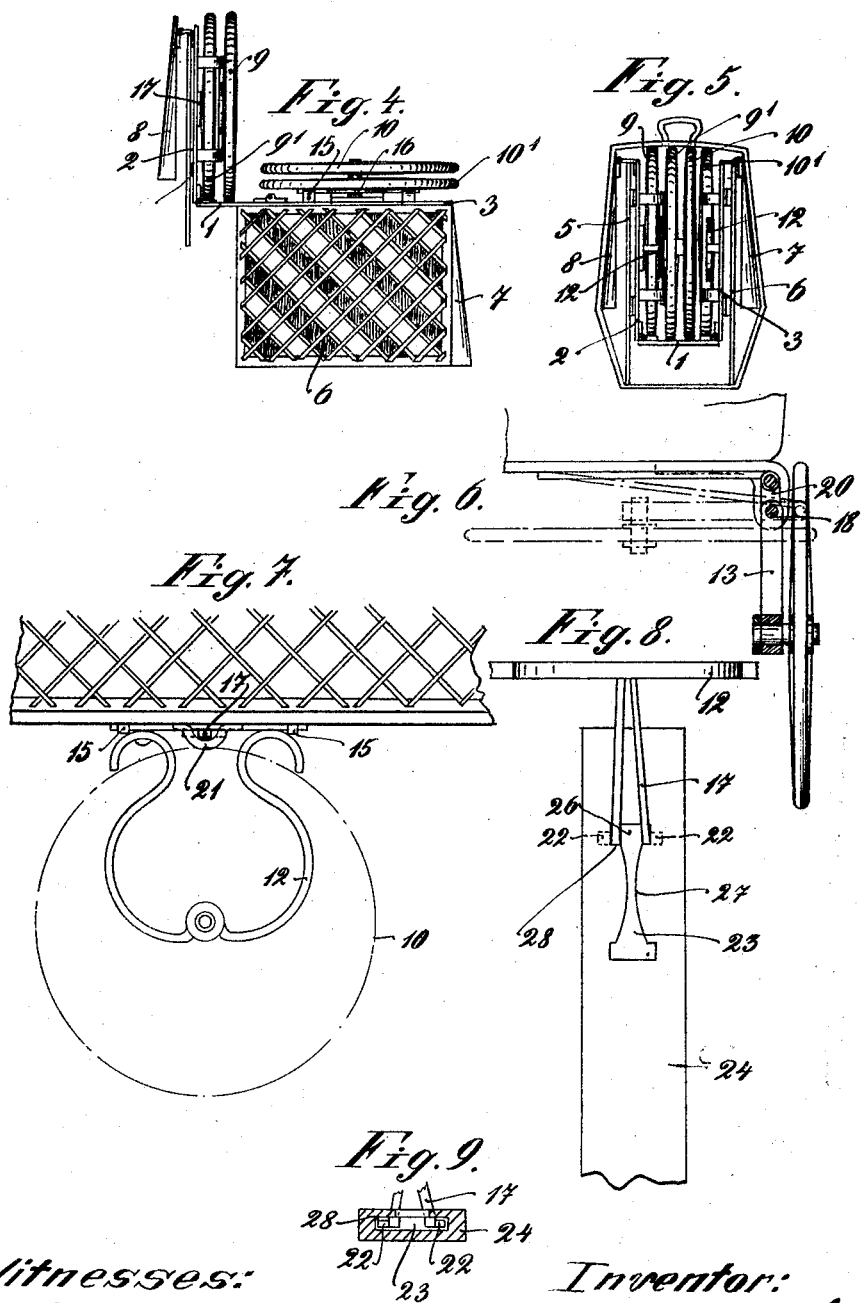

UNITED STATES PATENT OFFICE.

ALEXANDER STEIN, OF BERLIN, GERMANY.

COLLAPSIBLE BABY-CARRIAGE.

No. 821,896.  Specification of Letters Patent.  Patented May 29, 1906.

Application filed May 10, 1905. Serial No. 259,707.

*To all whom it may concern:*

Be it known that I, ALEXANDER STEIN, a subject of the German Emperor, residing at Berlin, Germany, 63 Weidenweg, have invented certain new and useful Improvements in Collapsible Baby-Carriages and other Vehicles; and I do hereby declare the following to be a full, clear, and exact description of the invention, such as will enable others skilled in the art to which it appertains to make and use the same.

My invention relates to collapsible vehicles, such as perambulators, baby-carriages, children's wail-carts, and the like, whether with two or four wheels.

In the accompanying drawings the invention is shown applied to a four-wheeled perambulator.

Figure 1 is a side elevation, Fig. 2 a front view, and Fig. 3 an under side view, of the vehicle in ordinary condition. Fig. 4 shows the vehicle in course of being folded up. Fig. 5 shows the same after folding up. Fig. 6 shows a portion of the vehicle drawn to an enlarged scale for the purpose of better illustrating the method of folding the wheels. Fig. 7 is a side elevation of Fig. 6. Fig. 8 is an under side view of a portion of one of the fillets with stays and spring connected thereto. Fig. 9 is a detail view showing the method of connecting the stays with the fillet.

The body of the vehicle consists of a bottom divided into three parts 1 2 3, Fig. 3, hinged together at 4, of the side walls comprising the two parts 5 6, of the front 8, and of the back 7. All these parts 5 6 7 8 are hinged or jointed to the parts 2 3, but not to the part 1, and they may be secured together when the vehicle is in use by hooks and eyes or like catches.

12 and 13 are springs for the axle-pins 11 of the wheels 9 9' 10 10'. They are secured, with capability of turning, to the bottom parts 2 3 by means of cranked axes 18, Figs. 6 and 7. Stays 16 17 are suitably jointed to the cranks 20 21 of the said axes 18, the crank 20 trending upward and the crank 21 downward.

The essential feature of the invention is that the stays 16 17 are formed so as to present bifurcating resilient arms provided at their ends with lateral members or projections 22, Figs. 8 and 9, which when the springs 12 13 are swung out slide in the guide-grooves 23, formed in the fillets 24, secured to the parts 2 3. At the left-hand side of the vehicle the wheels fold up close against the carriage-bottom, while on the right-hand side the wheels when folded lie below the left-hand wheels. In this manner when the wheels 9' 10' are flapped over upon the springs 12 they lie directly upon the base parts 2 3, while the wheels 9 10 cover them. In consequence of the crank parts 20 21 trending in opposite directions—viz., in upward and downward directions, respectively—on the springs 12 and 13, carrying the wheels 9 10, swinging outward into the position for use, the end portions 22 of the resilient arms 17 slide in the grooves 23 from the inside outward, while on the wheels 9' 10' being brought into position for use the guide-pins 22 of the stays 16 slide in the grooves 25 from the outside inward—that is to say, in the reverse direction.

For the purpose of holding the wheels 9 9' 10 10' and the various stays in the position of use, Figs. 6 and 7, and thus maintaining the springs 12 13 in vertical position, the guide-grooves 23 25 are so formed at the ends 26, which receive the stays in the vertical position of the springs 12 13, Fig. 3, as to present shoulders 28, serving as to receive the stays.

When the baby-carriage is to be collapsed for transit, the catches which hold the walls 5 6 7 8 in position must be released and the walls flapped back upon the parts 2 3, Fig. 4. The cover and handle must be removed and the ends 22 of the stays 16 17 pressed together, so that they are released from the shoulders 28, the arms of the stays then entering the narrower portion 27 of the groove 23 immediately the springs 12 13 and wheels lie against the bottom parts 2 3. The parts are held together in collapsed condition by the ends 22 of the stays 16 17 entering the broader part of the guide-groove at the opposite end. The two bottom parts 2 3, with the side walls and wheels flapped back against them, Fig. 4, must then be turned on the part 1 in such manner that the wheels lie one against the other and are completely covered, Fig. 5.

Having thus described my invention, what I claim as new, and desire to secure by Letters Patent of the United States, is—

1. In a collapsible vehicle, in combination, a grooved bottom, cranked axes mounted to turn on the same, springs adapted to carry the wheels secured to the said axes, and stays presenting resilient bifurcated arms having terminal projections engaging in the vehicle-bottom, the grooves in which present shoulders to retain the stays in the position in which they are adjusted, substantially as described.

2. In a collapsible vehicle, in combination, a grooved bottom, cranked axes mounted to turn on the same, springs adapted to carry the wheels secured to the said axes, and stays presenting resilient bifurcated arms having terminal projections engaging in the vehicle-bottom, the grooves in which present widened ends to retain the stays in the position in which they are adjusted, substantially as described.

In testimony whereof I affix my signature in presence of two witnesses.

ALEXANDER STEIN.

Witnesses:
   HANS MÜLLER,
   HANS ERNST.